(12) United States Patent
Hartmann et al.

(10) Patent No.: US 11,739,634 B2
(45) Date of Patent: Aug. 29, 2023

(54) DEDICATED SUB FOR LOOK-AHEAD APPLICATIONS

(71) Applicants: Andreas Hartmann, Celle (DE); Jens Behnsen, Hannover (DE); Kersten Kraft, Celle (DE); David Boesing, Hannover (DE)

(72) Inventors: Andreas Hartmann, Celle (DE); Jens Behnsen, Hannover (DE); Kersten Kraft, Celle (DE); David Boesing, Hannover (DE)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 99 days.

(21) Appl. No.: 17/400,448

(22) Filed: Aug. 12, 2021

(65) Prior Publication Data
US 2022/0049602 A1 Feb. 17, 2022

Related U.S. Application Data

(60) Provisional application No. 63/064,793, filed on Aug. 12, 2020.

(51) Int. Cl.
*E21B 49/00* (2006.01)
*E21B 47/13* (2012.01)
(Continued)

(52) U.S. Cl.
CPC ............... *E21B 49/00* (2013.01); *E21B 7/04* (2013.01); *E21B 47/013* (2020.05);
(Continued)

(58) Field of Classification Search
CPC ........ E21B 47/0228; E21B 47/13; G01V 3/30
See application file for complete search history.

(56) References Cited

U.S. PATENT DOCUMENTS

2006/0011385 A1\* 1/2006 Seydoux ................. G01V 3/28
324/333
2008/0290873 A1 11/2008 Homan et al.
(Continued)

FOREIGN PATENT DOCUMENTS

WO 2009152014 A2 12/2009
WO 2011139761 A2 11/2011

OTHER PUBLICATIONS

International Search Report Issued in International Application No. PCT/US2021/045713 dated Nov. 16, 2021; 5 Pages.
(Continued)

*Primary Examiner* — Alvaro E Fortich
(74) *Attorney, Agent, or Firm* — CANTOR COLBURN LLP

(57) ABSTRACT

A drilling system and a method of drilling a wellbore in an earth formation. A first antenna is disposed at a first location near a drill string. A second antenna is disposed at a second location of the drill string. The first antenna has a first specific moment. One of the first antenna and the second antenna is operated as a transmitter that transmits a transmitted signal, and the other is operated as a receiver that receives a received signal in response to the transmitted signal. The processor determines a property of an earth formation from the received signal.

20 Claims, 6 Drawing Sheets

(51) Int. Cl.
*E21B 47/013* (2012.01)
*E21B 7/04* (2006.01)
*E21B 47/0228* (2012.01)
*G01V 3/30* (2006.01)

(52) U.S. Cl.
CPC .......... *E21B 47/0228* (2020.05); *E21B 47/13* (2020.05); *G01V 3/30* (2013.01)

(56) References Cited

U.S. PATENT DOCUMENTS

| | | |
|---|---|---|
| 2009/0129203 A1 | 5/2009 | Jones et al. |
| 2009/0301781 A1* | 12/2009 | Fang ........................ G01V 3/30 |
| | | 175/50 |
| 2011/0036569 A1* | 2/2011 | Bass ........................ G01V 3/28 |
| | | 166/250.16 |
| 2011/0238220 A1 | 9/2011 | Seydoux et al. |
| 2013/0226459 A1* | 8/2013 | Gorek ................... E21B 47/024 |
| | | 702/7 |
| 2019/0078432 A1* | 3/2019 | Ahmadi Kalateh Ahmad ............ |
| | | E21B 7/04 |

OTHER PUBLICATIONS

Written Opinion Issued in International Application No. PCT/US2021/045713 dated Nov. 16, 2021; 4 Pages.

* cited by examiner

DEDICATED SUB FOR LOOK-AHEAD APPLICATIONS

CROSS-REFERENCE TO RELATED APPLICATIONS

This application claims the benefit of U.S. Application Ser. No. 63/064,793, filed on Aug. 12, 2020, the contents of which are incorporated by reference herein in their entirety.

BACKGROUND

In the resource recovery industry, a wellbore is drilled through a formation using a drill string having a drill bit at a bottom end. One aspect of drilling the wellbore occurs when the drill string approaches a bed boundary of the formation. It is useful to be able to sense the approach of the drill bit to the bed boundary, for example, in order to enter the boundary at a selected angle. In general, electromagnetic measurements of a formation near the drill bit can be useful in detecting an approaching bed boundary. However, the electronic equipment needed to produce such electromagnetic measurements can be placed only at selected locations on the drill string uphole and away from the drill bit due to their size requirements.

SUMMARY in one aspect, a method of drilling a wellbore through an earth formation is disclosed. A first antenna is disposed at a first location of a drill string. A second antenna is disposed at a second location of the drill string, wherein the first antenna has a first specific moment smaller than a second specific moment of the second antenna. One of the first antenna and the second antenna is operated as a transmitter to transmit a transmitted signal. The other of the first antenna and the second antenna is operated as a receiver to receive a received signal in response to the transmitted signal. A property of the earth formation is determined from the received signal.

In another aspect, a drilling system for drilling a wellbore through an earth formation is disclosed. The drilling system includes a drill string, a first antenna, second antenna and a processor. The first antenna is disposed at a first location of a drill string and has a first specific moment. The second antenna is disposed at a second location of the drill string and has a second specific moment larger than the first specific moment. One of the first antenna and the second antenna is operated as a transmitter that transmits a transmitted signal and the other of the first antenna and the second antenna is operated as a receiver that receives a received signal in response to the transmitted signal. The processor is configured to determine a property of the earth formation from the received signal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
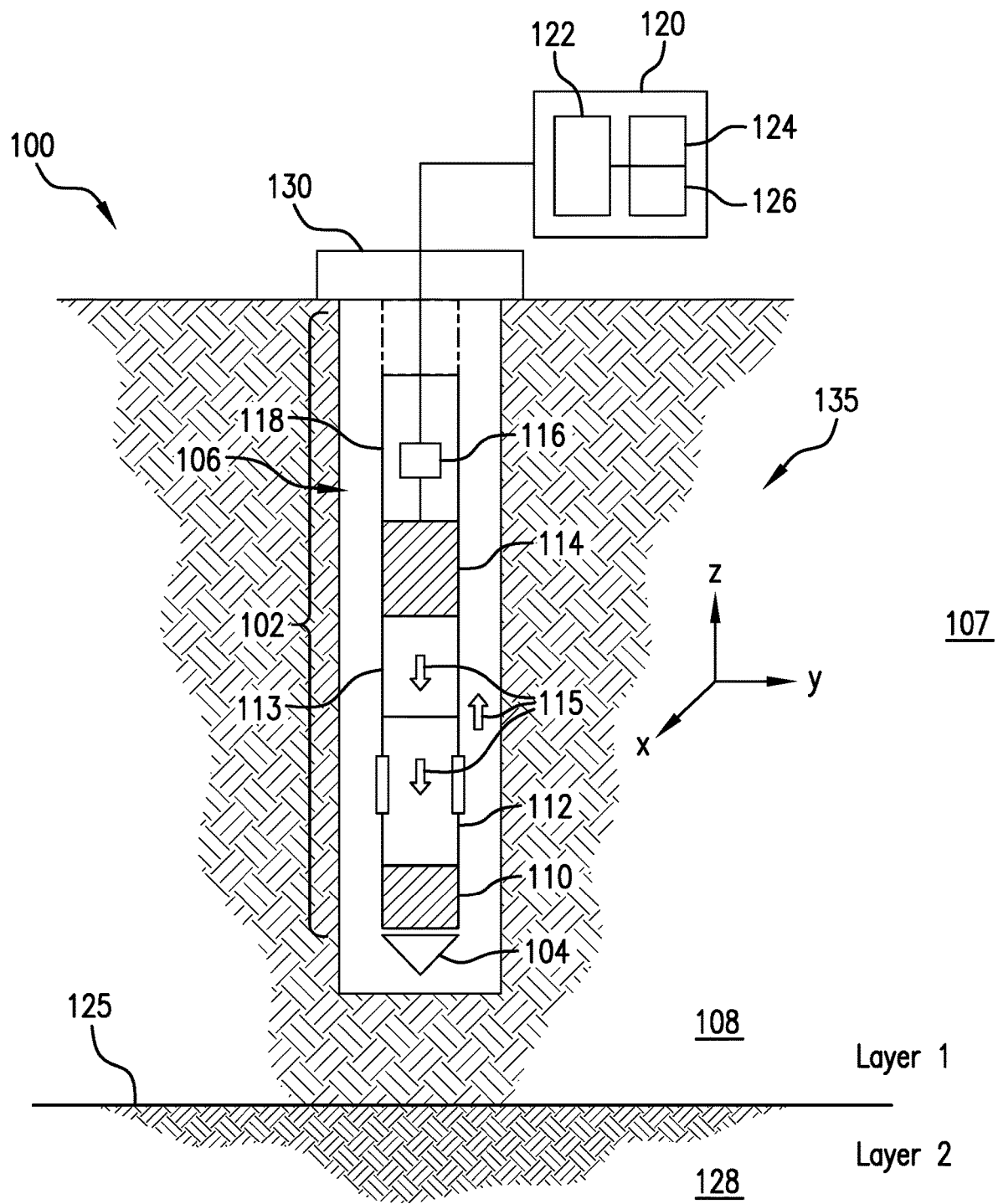
FIG. 1 shows a drilling system for bed boundary detection and drilling with respect to a bed boundary in an embodiment.

Referring to FIG. 1, a drilling system 100 suitable for bed boundary detection and drilling with respect to a bed boundary 125 is shown in an illustrative embodiment. The drilling system 100 includes a drill string 102 disposed in a wellbore 106 and having a drill bit 104 at a bottom end thereof. A rotary table 130 at a surface location can be used to rotate the drill string 102 in order to rotate the drill bit 104 to form the wellbore 106. Alternately, a motor (not shown) disposed in the drill string 102 can rotate the drill bit 104 to form the wellbore 106. The drill string 102 includes a steering assembly 112 near the drill bit 104 for orienting the drill bit 104 in a selected direction in order to control the direction of drilling of the drill string 102. A drilling fluid 115, also known as drilling mud, or simply mud is pumped through the drill string 102 and supplied to wellbore 106 via openings in drill bit 104. Typically, the drilling fluid may be chemically aggressive, e.g., corrosive or abrasive due to its ingredients, such as solids. Accordingly, the flow of drilling fluid may cause damage or wear on the components of drill string 102, as discussed herein. A coordinate system 135 is provided to show body-centered coordinate axes of the drill string 102. A longitudinal axis of the drill string 102 extends along the z-axis of the drill string 102. The x- and y-axes are in a plane transverse to the longitudinal axis. The drill string 102 is shown within a formation 107 that includes a first layer 108 and a second layer 128 separated by bed boundary 125. The drill string 102 is in the first layer 108 and drilling the wellbore 106 to approach the second layer 128. In FIG. 1, drill string 102 is shown to approach second layer 128 along a line perpendicular to second layer 128 or bed boundary 125. In embodiments, drill string 102 may also approach second layer 128 along a line that is not perpendicular to second layer 128 or bed boundary 125. For example, drill string 102 may approach second 128 at an angle between 0° and 90°.

The drill string 102 includes a formation resistivity sensor system that includes a transmitter 114 at a transmitter location and a receiver 110 at a receiver location. The transmitter location is distal or away from the drill bit 104 and the receiver location is adjacent to or close to the drill bit 104. In various embodiments, the transmitter location is upstring of the steering assembly 112, i.e., with the steering assembly 112 between the transmitter 114 and the drill bit 104. In various embodiments, the receiver location is between the steering assembly 112 and the drill bit 104. An upper section 118 upstring of the transmitter 114 extends to the surface. The drill string 102 can also include a bottom-hole assembly (BHA) 113. In various embodiments the transmitter location can be upstring of the BHA 113 (as shown in FIG. 1) or between the BHA 113 and the steering assembly 112. In various embodiments, the receiver location may be below the BHA 113 or between the BHA 113 and the steering assembly 112 The drill string 102 and/or BHA 113 can further include a power supply 116 for supplying a current to the transmitter 114. The power supply 116 can be a battery package, e.g., a battery package in the receiver 110 and is electrically connected to the transmitter 114 via a wiring, e.g., a wiring that passes through the steering assembly 112. In an embodiment in which the receiver 110 is on the steering assembly 112, the power supply 116 can be a power supply of the steering assembly 112.

In various embodiments, the drill string 102 is in communication with a control unit 120. The control unit 120 can be at a surface location, as shown in FIG. 1, or at a location in the drill string 102. The control unit 120 includes a processor 122 and a memory storage device 124. The memory storage device 124 has stored therein a set of programs or instructions 126 that when accessed by the processor 122 enables the processor 122 to perform various operations and functions disclosed herein. In various embodiments, the control unit 120 controls operations of one or more of the transmitter 114, the receiver 110, the power supply 116, the steering assembly 112, the drill bit 104 and other modules of the drill string 102. In an embodiment, the control unit 120 controls the power supply 116 to provide a selected current to generate an electromagnetic source signal at transmitter 114. The control unit 120 further processes signals received at the receiver 110 in response to the generated source signal. As the drill bit 104 approaches the bed boundary 125, the source magnetic field signal creates eddy currents in the first layer 108 and the second layer 128. These eddy currents in turn create a secondary magnetic field. Together, source and secondary magnetic fields form the signal that is received at receiver 110. The control unit 120 therefore can determine a property of the bed boundary 125 such as distance to the bed boundary 125 and/or an angle of the drill string 102 with respect to the bed boundary 125 from the received signal. The control unit 120 further controls the steering assembly 112 in order to steer the drill string 102 with respect to the bed boundary 125 based on the determined property.

While FIG. 1 shows an embodiment in which the transmitter location is distal from the drill bit 104 and the receiver location is adjacent the drill bit 104, this is not meant to be a limitation of the invention. In an alternate embodiment, the location of the transmitter can be switched such that the transmitter is near the drill bit 104 and the receiver is distal from the drill bit 104.

Figure 2:
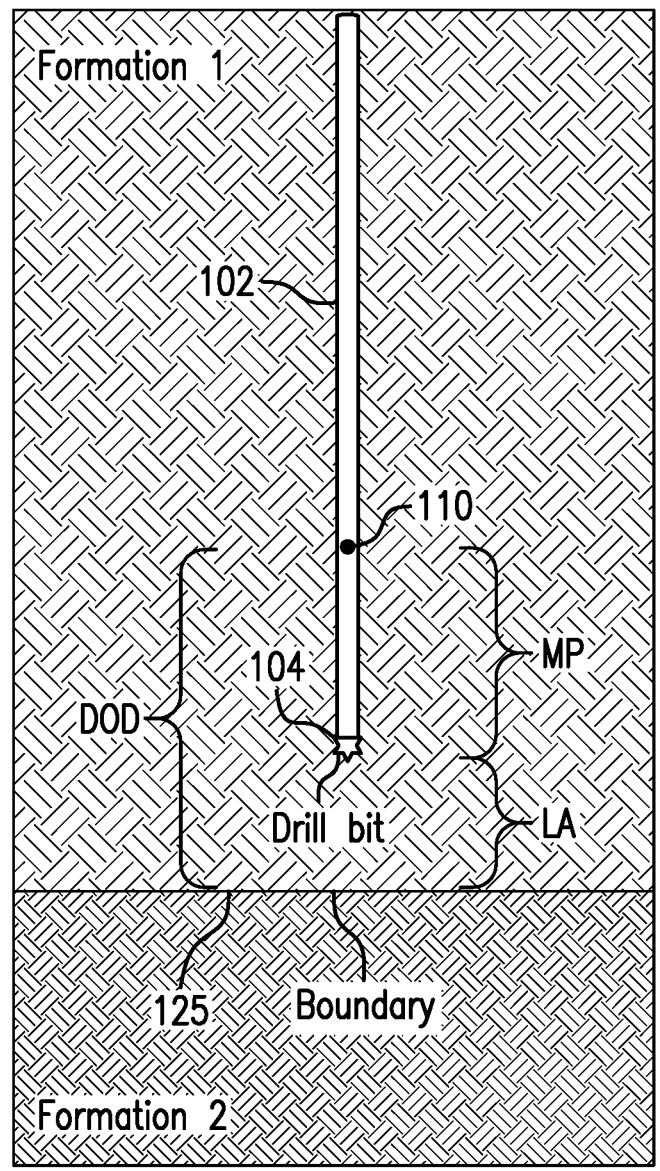
FIG. 2 shows the drill string of FIG. 1 marked with various distances and locations used in detecting the bed boundary.

FIG. 2 shows the drill string 102 of FIG. 1 marked with various distances and locations used in detecting the bed boundary. A look ahead (LA) may be defined as the distance between a drill bit 104 (or any other selected location in drill string 102, such as but not limited to the receiver location or the transmitter location) and the bed boundary 125 in the direction of the tool axis determined by the methods disclosed herein. The value of look ahead depends on a capability of the formation resistivity sensor system to detect environmental changes ahead of the drill bit 104, such as environmental changes due to the presence of the bed boundary 125. A measurement point (MP) may be defined at a distance between the receiver location and the drill bit 104 and is dependent on a specification of the BHA 113 and/or the drill string 102. Depth of detection (DOD) is determined based on the measured signals, formation properties, properties of drill string 102, and properties of the formation resistivity sensor system. The depth of detection is a maximum distance of the receiver from the bed boundary 125 at which the formation resistivity sensor system is able to detect the bed boundary 125. LA is calculated by taking the difference between the depth of detection (DOD) and the measurement point (MP).

Figure 3:
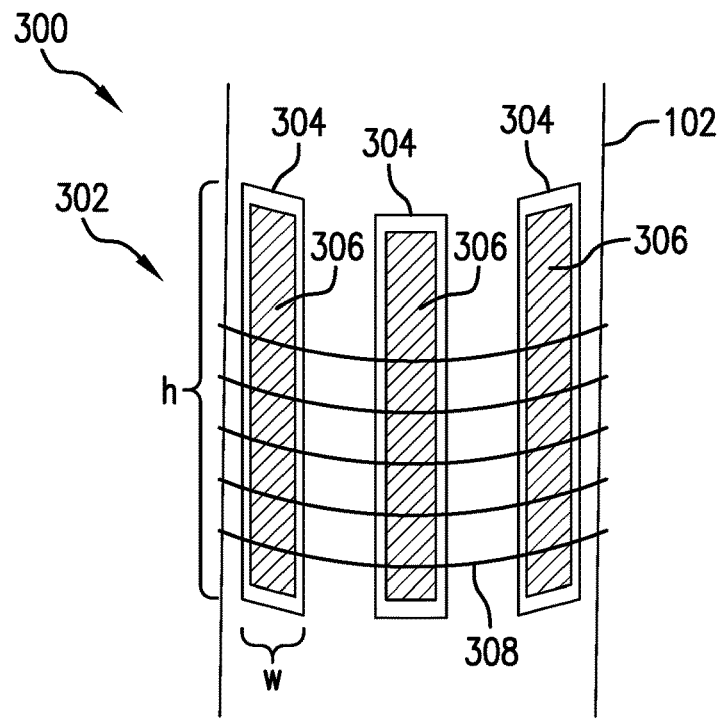
FIG. 3 shows a close-up of a section of the drill string including an antenna.

FIG. 3 shows a close-up of a section 300 of the drill string 102 including an illustrative design of an antenna 302 of the formation resistivity sensor system. Antenna 302 may be operated as a transmitter or a receiver antenna. It is to be understood that the antenna design shown in FIG. 3 is not meant to be a limitation of the invention. The antenna 302 can be used as either a transmitter antenna of the transmitter 114 or a receiver antenna of the receiver 110. Alternatively, or in addition, antenna 302 can be used as a transmitter antenna and a receiver antenna (also known as a transceiver). The antenna 302 includes a plurality of slots 304 formed in a collar of the drill string 102. The slots 304 are circumferentially spaced around the collar. The dimensions of the slots 304 at the surface of the collar are indicated by length (h) and width (w). Slots 304 may include a ferromagnetic material, for instance a ferrite core, 306 disposed therein. A conductive coil 308 is wrapped around a circumference of the collar and over the ferrite cores 306, forming an antenna loop. A circumferential recess (not shown) in the collar allows the conductive coil 308 to lie below an outer surface of the collar. A magnetic axis of the antenna is directed normal to a cross-sectional area of the antenna loop. The magnetic axis may be parallel to or at an angle to the z-axis of the drill string 102.

Figure 4:
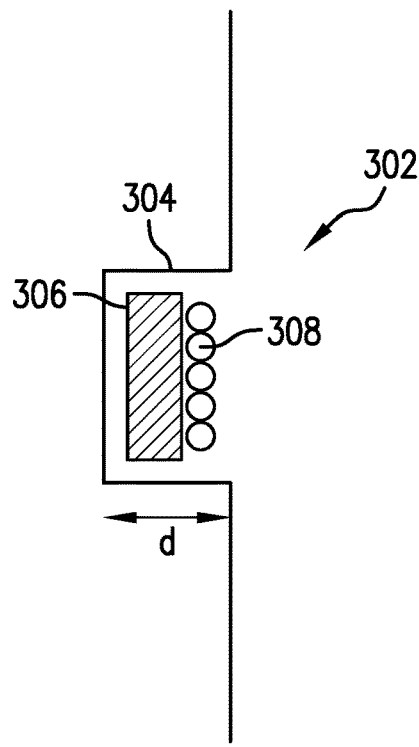
FIG. 4 shows a slot of the antenna of FIG. 3 in a side view.

FIG. 4 shows a slot 304 of the antenna 302 in a side view. The slot has a selected depth (d). A ferrite core 306 is placed within the slot and the conductive coil 308 forms one or several loops around the collar at an outward-facing surface of the ferrite core 306. A protection cover (not shown), such as a protection cover made of plastic or metal, may partially cover the slot 304 and the antenna 302 including the ferrite core 306 and the conductive coil 308. Notably, like the width, the length and the depth of slot 304, the protection cover has two effects. First, the larger the protection cover is, the better the antenna is protected against exposure to drilling fluid and/or contact to the borehole wall. Secondly, a larger protection cover will reduce the specific moment of antenna 302. In one embodiment, one of the antennas has a protection cover larger than the other of the antennas. In another embodiment, only one of the antennas has a protection cover while the other of the antennas does not have a protection cover.

The antenna 302 has an associated antenna moment M which is the magnetic moment of a magnetic multipole, such as a magnetic dipole, a magnetic quadrupole, etc., created by passing a current through the wire of the antenna. The antenna moment M is measured in current times area (A*m^2). The antenna 302 also has an associated specific moment (Ms), equal to the antenna moment divided by the current in the antenna. The specific moment has the dimensions of area (m^2). If antenna 302 is used as a receiver, its sensitivity is related to its specific moment. If antenna 302 is used as a transmitter, its transmitting power is related to its specific moment.

A transmitter moment refers to an antenna moment of a transmitter antenna used in transmitter 114 and a receiver moment refers to an antenna moment of a receiver antenna used in a receiver 110. The transmitter moment is indicative of an output of the transmitter 114 and is equal to its specific moment times the electrical current flowing through the transmitter 114. ((transmitter current)×(transmitter specific moment)). The combined moment of a two-antenna system including a transmitter 114 and receiver 110 is equal to (transmitter current)×(transmitter specific moment)×(receiver specific moment). The combined moment is therefore a product of the transmitter moment and the receiver moment, where transmitter moment=(transmitter current)×(transmitter specific moment) and receiver moment=receiver specific moment.

The specific moment of the receiver 110 is defined by the dimensions of the receiver 110, such as the width (w) of each slot 304 and of the ferrite core 306 contained therein, which controls the overall area of receiver 110 that is exposed to the drilling environment. These dimensions can be reduced to reduce a specific moment of the receiver 110. Reducing these dimensions also reduces the weight of the receiver antenna, as well as a vulnerability of the receiver 110 to failure due to vibration.

In another embodiment, the specific moment of the receiver 110 can be reduced by reducing the length (h) of each slot 304, thereby reducing the overall length and overall area of antenna material, such as ferrite core 306 or conductive coil 308 exposed to the drilling environment (e.g. exposed to the drilling fluid 115 or the wall of wellbore 106). In yet another embodiment, the specific moment can be reduced by reducing the depth (d) of each slot, thereby increasing the capacity of the antenna to withstand bending forces encountered in directional drilling. In yet another embodiment, the specific moment can be reduced by reducing a number of turns of the coil around the collar, thereby reducing the overall length and overall area of antenna material exposed to the drilling environment.

The transmitter moment of the transmitter 114 can be reduced using the same methods disclosed above with respect to the receiver 110 (i.e., changing the specific moment of the antenna). Additionally, the transmitter moment can be reduced by reducing an amount of current in the transmitter 114. The lower current also yields lower power dissipation and power requirements, leading to better reliability under downhole temperatures. Additionally, smaller size electronics can be used, thereby reducing overall space needed by the transmitter. Smaller size electronics are also less prone to failure under vibration, making the transmitter antenna more rugged.

In various embodiments, the specific moment of receiver 110 is less than the specific transmitter moment of transmitter 114. In an embodiment, the specific receiver moment is half of the specific transmitter moment or less than half of the specific transmitter moment. In other various embodiments, the specific receiver moment can be less than $1/10^{th}$ of the specific transmitter moment, less than $1/100^{th}$ of the specific transmitter moment, less than $1/1000^{th}$ of the specific transmitter moment, etc. For a specific transmitter moment of 1 m^2, the specific receiver moment can be between 1 m^2 and 0.01 m^2. A significant look ahead can be achieved with a (specific transmitter moment)/(specific receiver moment) ratio of 10 (e.g. (specific transmitter moment)/(specific receiver moment) ratio=1 m^2:0.1 m^2 or (specific transmitter moment)/(specific receiver moment) ratio=0.1 m^2:0.01 m^2,). Other (specific transmitter moment)/(specific receiver moment) ratios can include 100 (e.g. (specific transmitter moment)/(specific receiver moment) ratio=1 m^2:0.01 m^2), 50 (e.g. (specific transmitter moment)/(specific receiver moment) ratio=10 m^2:0.02 m^2), 2 (e.g. (specific transmitter moment) (specific receiver moment) ratio=1 m^2:0.5 m^2), and 20 (e.g. (specific transmitter moment)/(specific receiver moment) ratio=1 m^2:0.05 m^2). The transmitter 114 can generate the source electromagnetic signal at a frequency in a range from about 20 kHz to about 50 kHz. In an alternative embodiment, the transmitter 114 can generate the source electromagnetic signal in a low frequency range that is from about 3 kHz to about 8 kHz. In an alternate embodiment, the transmitter 114 can generate the source electromagnetic signal in a low frequency range that is from about 1 kHz to about 100 kHz.

In one embodiment, the receiver 110 has a specific moment of 1 m^2. For this receiver 110, the slots 304 have a length from 300 millimeters (mm) to 500 mm, and a width selected to expose the antenna along about 50% of the circumference of the collar. In another embodiment, the receiver has a magnetic moment of 0.1 m^2. For this receiver 110, the slots 304 have a length of about 100 mm and a width selected to expose the antenna along about 30 of the circumference of the collar. It is noted that the smaller the receiver 110, the closer the receiver can be placed to the drill bit 104.

As discussed herein for illustrative purposes, the transmitter 114 is oriented with its magnetic axis parallel to the longitudinal axis (i.e., along the z-axis) of the drill string 102. However, the transmitter 114 can be orientated with its magnetic axis within a transverse plane defined by the x-axis and y-axis. Alternatively, the transmitter 114 can be oriented along a direction tilted relative to the z-axis. Tilted relative to the z-axis is defined as an angle between z-axis and antenna direction between 0° and 90°. Similarly, the receiver 110 can be oriented with its magnetic axis parallel to the z-axis or oriented with its magnetic axis within the transverse plane or oriented tilted relative to the z-axis. In various embodiments, the transmitter 114 can include one or more transmitters antennas. In various embodiments, the receiver 110 can include one or more receiver antennas. In one embodiment, the one or more transmitters include a z-oriented transmitter and an x-oriented transmitter. In another embodiment, the one or more transmitters include a z-oriented transmitter, y-oriented transmitter and x-oriented transmitter. In another embodiment, the one or more transmitters include one or more tilted antennas. In various embodiments, either the transmitter or the receiver or both can be a tilted antenna, i.e., an antenna oriented at a selected angle between but not including 0 degrees and 90 degrees to the z-axis.

The above discussion is with respect to magnetic multipole and, in particular with respect to magnetic dipoles. The same discussion, however, applies to electric multipoles, and in particular with respect to electric dipoles which can be realized by electrodes at a distance or by toroid antennas. Toroid antennas comprise a conductive coil that is wound about a coil axis, wherein the coil axis is wound about the length axis of the toroid, for example the longitudinal axis of the drill string (z-axis, cf. FIG. 1). When acting as a transmitter, an alternating current supplied to the conductive coil creates an alternating electric dipole moment along the length axis of the toroid that in turn creates an alternating electric dipole field around the toroid. When acting as a receiver, an alternating electric field through the toroid will cause an electric voltage in the conductive coil of the toroid that can be sensed and thus can be used to measure the alternating electric field. Typically, one or more ferrite cores may be distributed along at least a portion of the coil axis and the conductive coil is wound about the one or more ferrite cores. Similar to the antennas shown in FIGS. 3 and 4, toroids are typically installed in recesses or slots of a particular width and depth. Like the magnetic dipole antennas discussed with respect to FIGS. 3 and 4, pairs of electric dipoles can be used to estimate electric properties (such as conductivity or resistivity) in the environment of the toroid pairs.

The specific moment of a toroid transmitter or receiver antenna depends on the dimensions of the toroid antenna, such as the width (w) of its slot and/or its ferrite core contained therein, which controls the overall area of the toroid antenna that is exposed to the drilling environment. These dimensions can be reduced to reduce a specific moment of the toroid antenna. Reducing these dimensions also reduces the weight of the receiver antenna, as well as a vulnerability of the toroid antenna to failure due to vibration.

In another embodiment, the specific moment of a toroid antenna can be reduced by reducing the depth (d) of each slot, thereby increasing the capacity of the antenna to withstand bending forces encountered in directional drilling. In yet another embodiment, the specific moment of a toroid antenna can be reduced by reducing a number of turns of the conductive coil about the coil axis, thereby reducing the overall area of antenna material exposed to the drilling environment.

Figure 5:
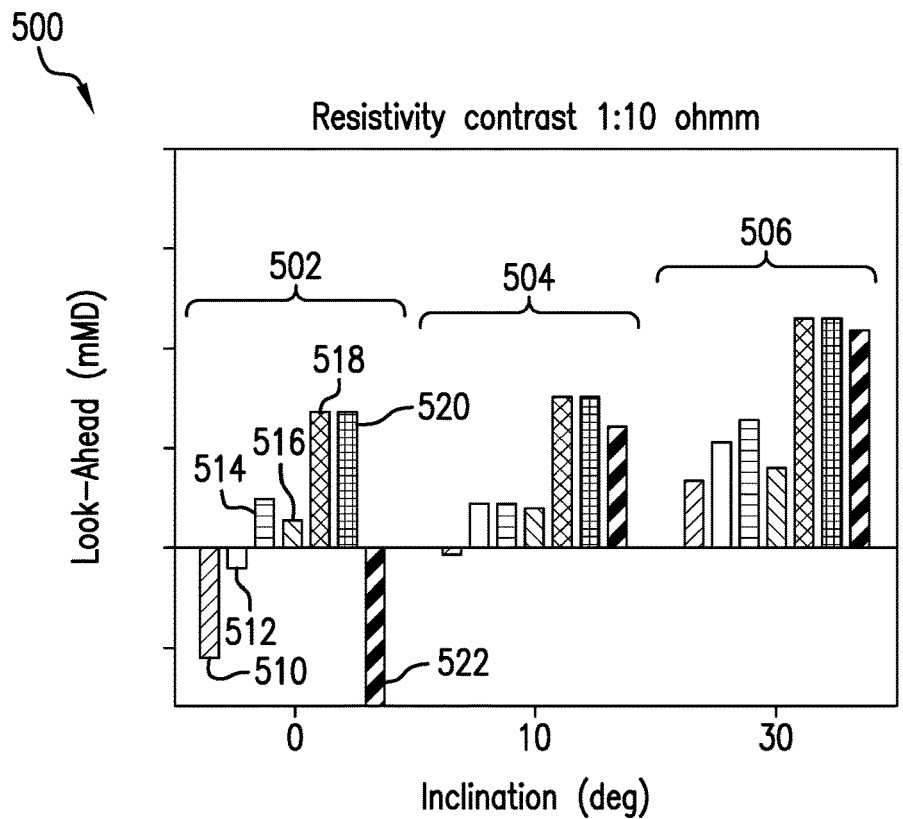
FIG. 5 shows a plot comparing the look-ahead ability of various transmitter-receiver configurations in a formation with the first layer and the second layer having resistivity contrast in a ratio of 1:10.

FIG. 5 shows a plot 500 comparing the look-ahead ability of various transmitter-receiver configurations. The configurations are tested in a formation having a first layer and a second layer, with a resistivity between the first layer and the second layer having a ratio of 1:10. Results are shown for tests performed with the drill string at a zero degree inclination (502) to the bed boundary, and at a 10 degree inclination (504) to the bed boundary, and at a 30 degree inclination (506) to the bed boundary. At each inclination, seven transmitter-receiver configurations are tested. The configurations are labelled with respect to the test performed at zero degree inclination (502). The order of the configurations is maintained for the tests at the 10 degree inclination and the 30 degree inclination.

In configurations (510, 512, 514, 516, 518, 520, and 522), various receiver/transmitter configurations are simulated to assess their look-ahead capability. Namely in configuration 518, the z-directed receiver is placed at or near the drill bit with a specific magnetic moment of 1 $m^2$ and the transmitter is placed uphole of the receiver and operated within the low frequency range. In configuration 520, the z-directed receiver is placed at or near the drill bit with a specific magnetic moment of 0.1 $m^2$ and the transmitter is placed uphole of the receiver at the same distance as in configuration 518 and operated within the low frequency range. In configuration 522, the z-directed receiver is placed at or near the drill bit with a magnetic moment of 0.01 $m^2$ and the transmitter is placed uphole of the receiver at the same distance as in configuration 518 and operated within the low frequency range.

The configurations 518 and 520 show approximately the same lookahead, even though the receiver in configuration 518 has ten times greater specific magnetic moment than the receiver in configuration 520. Thus, it is possible to build the receiver in configuration 520 to be more compact, and thus more rugged than the receiver in configuration 518. For example, the receiver can have smaller width or length of slots (e.g., slots 304) than that of the transmitter. Alternatively, or in addition, ferrite cores (e.g., ferrite cores 306) in the receiver can have smaller width or length than ferrite cores of the transmitter. In yet another embodiment, the receiver may have a smaller depth of slots (such as slots 304) than those of the transmitter. In yet another embodiment, the receiver may have a smaller number of turns of the coil around the collar (such as conductive coil 308) than that of the transmitter, thereby reducing the overall length and overall area of antenna material exposed to the drilling environment. Alternatively, one can increase the moment of the transmitter away from the bit and reduce the moment of the receiver at the bit, while keeping the combined moment the same and providing the same lookahead.

Similar results can be seen at an inclination of 10 degrees. At an inclination of 10 degrees, the first (baseline) configuration is unable to look ahead of the drill hit. However, the configurations with the x-directed receivers and the z-directed receivers located at or near the drill bit demonstrate the ability to look ahead of the drill bit.

At an inclination of 30 degrees, the first configuration shows an ability to look ahead of the drill bit. However, the configurations with the x-directed receivers and the z-directed receivers at or near the drill bit still demonstrate a greater look-ahead ability than the baseline configuration.

Figure 6:
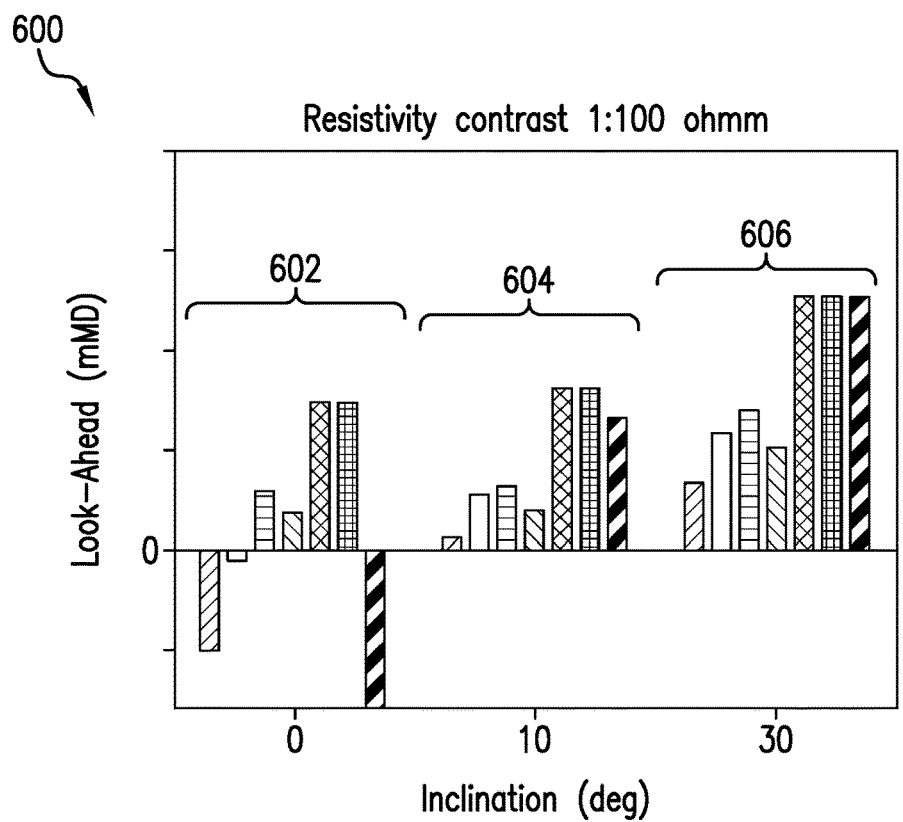
FIG. 6 shows a plot comparing the look-ahead ability of the various transmitter-receiver configurations discussed in FIG. 5 in a formation with the layer and the second layer having resistivity contrast in a ratio of 1:100.

FIG. 6 shows a plot 600 comparing the look-ahead ability of the various transmitter-receiver configurations discussed in FIG. 5 in a formation with the first layer and the second layer having resistivity contrast in a ratio of 1:100. The configurations are tested at a zero degree inclination (602) to the bed boundary, at a 10 degree inclination (604) to the bed boundary, and at a 30 degree inclination (606) to the bed boundary.

At an inclination of 0 degrees to the bed boundary, the first (baseline) configuration shows no look-ahead capability. Similarly, the x-directed receiver of the second configuration is not able to detect the boundary. In the third configuration however, operating in the frequency range allows detection of the bed boundary using the x-directed receiver at or near the drill bit. Use of a z-directed receiver at or near the drill bit, as shown in the fourth configuration, fifth configuration and sixth configuration, demonstrates a look-ahead ability of the receiver. However, the z-directed receiver with a magnetic moment of 0.01 $m^2$ and the transmitter operating within a low frequency range (seventh configuration), appears to provide no additional look-ahead capability.

Similar results can be seen at an inclination of 10 degrees. At an inclination of 10 degrees, the first (baseline) configuration shows a small ability to look ahead of the drill bit. However, the various configurations with the x-directed receivers and the z-directed receivers at the drill bit demonstrate a greater ability to look ahead of the drill bit than the baseline configuration.

At an inclination of 30 degrees, the first (baseline) configuration shows an ability to look ahead of the drill bit. However, the various configurations with the x-directed receivers and the z-directed receivers at the drill bit still demonstrate a greater look-ahead ability than the baseline configuration.

Figure 7:
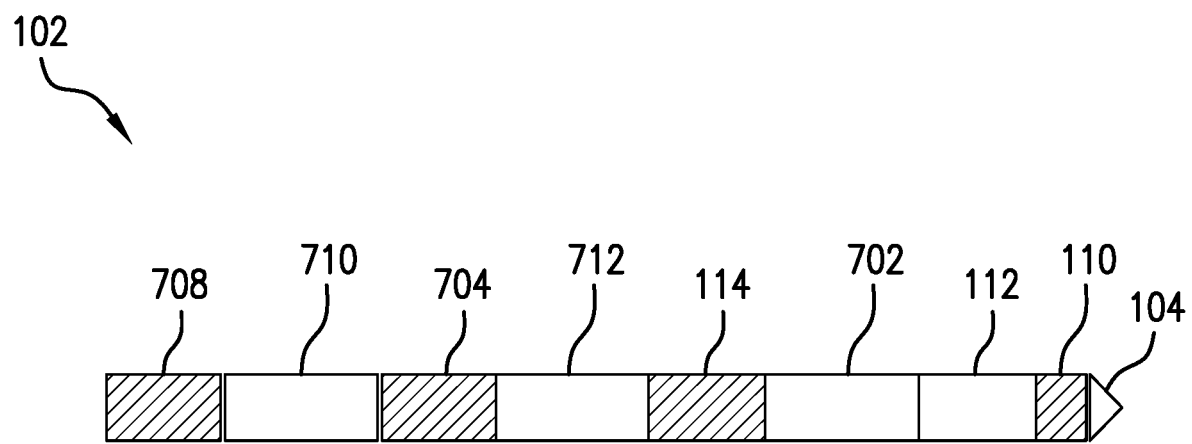
FIG. 7 shows a drill string in an alternate configuration which includes additional receivers in the drill string.

FIG. 7 shows a drill string 102 in an alternate configuration which includes additional receivers in the drill string 102. Starting at a bottom end of the drill string 102, the receiver 110 is placed at or near the drill bit 104. A steering assembly 112 is placed uphole of the receiver 110, and another module 702 can be included in the drill string 102 uphole of the steering assembly 112. The transmitter 114 is located uphole of the other module 702. Additional receivers 704 and 708 are located uphole of the transmitter 114. These additional receivers 704 and 708 can be separated from each other and from the transmitter 114 by other modules 710 and 712 of the drill string 102.

The receiver 110 can be wired, e.g., as part of a bottomhole assembly (BHA) or can be an autonomous module with telemetry, such as short hop telemetry connecting to the BHA. In particular, the antennae of the receiver and transmitter modules 114, 110, 704, and 708 can be used to perform short hop telemetry to the BHA or to an uphole location such as the surface control unit 120, FIG. 1.

Figure 8:
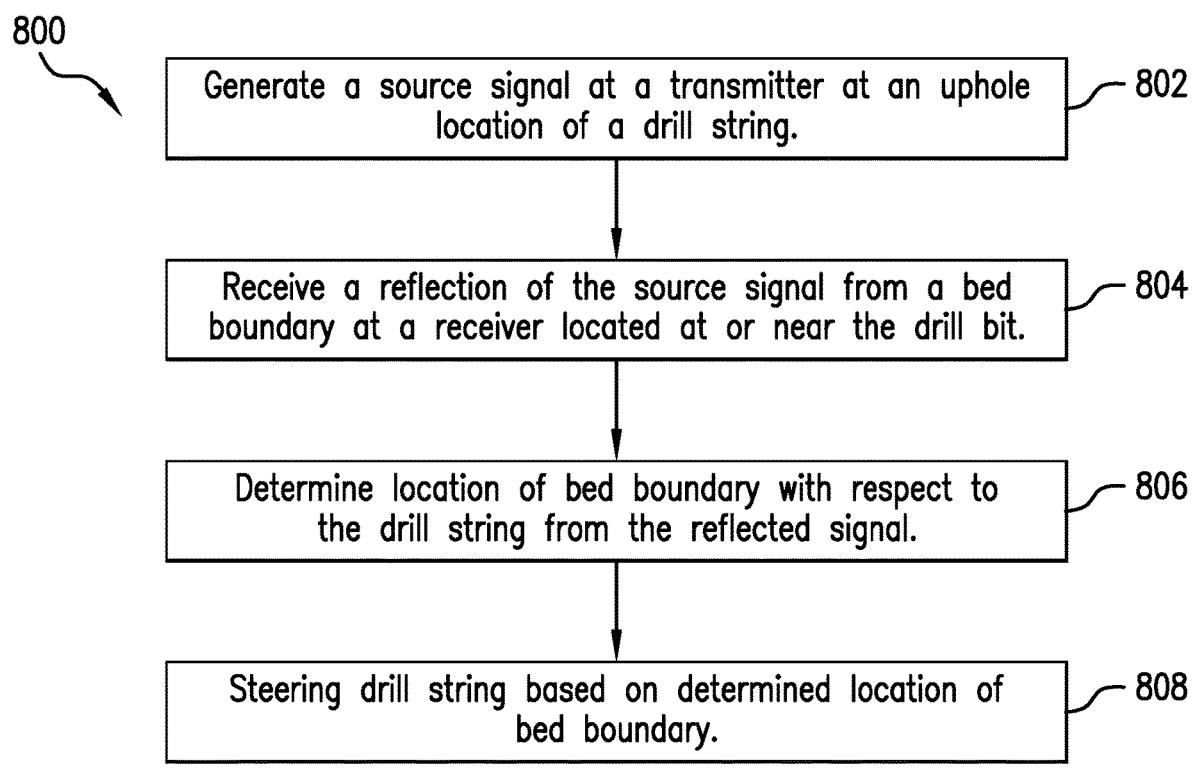
FIG. 8 shows a flowchart of a method for drilling a wellbore using the look ahead drilling system disclosed herein.

FIG. 8 shows a flowchart of a method for drilling a wellbore using the look ahead drilling system disclosed herein. In box 802, a source signal is generated at a transmitter at an uphole location of a drill string. In box 804, a combined signal coming from the source signal and from a bed boundary is received at a receiver located at or near the drill bit. In box 806, a location of the drill bit with respect to the bed boundary is determined from the signal induced by the bed boundary. In box 808, the drill bit and/or drill string is steered with respect to the determined location of the bed boundary.

Set forth below are some embodiments of the foregoing disclosure:

Embodiment 1

A method of drilling a wellbore through an earth formation. A first antenna is disposed at a first location of a drill string. A second antenna is disposed at a second location of the drill string, wherein the first antenna has a first specific moment smaller than a second specific moment of the second antenna. One of the first antenna and the second antenna is operated as a transmitter to transmit a transmitted signal. The other of the first antenna and the second antenna is operated as a receiver to receive a received signal in response to the transmitted signal. A property of the earth formation is determined from the received signal.

Embodiment 2

The method of any prior embodiment, wherein at least one of the first specific moment and the second specific moment is specific magnetic moment.

Embodiment 3

The method of any prior embodiment, wherein at least one of the first specific moment and the second specific moment is a specific electric moment.

Embodiment 4

The method of any prior embodiment, wherein the drill string further comprises a drill bit and the distance of the first antenna to the drill bit is smaller than the distance of the second antenna to the drill bit.

Embodiment 5

The method of any prior embodiment, wherein the first specific moment is one of: (i) half of the second specific moment; (ii) less than half of the second specific moment; (iii) less than $1/10^{th}$ of the second specific moment; (iv) less than $1/100^{th}$ of the second specific moment; and (v) less than $1/1000^{th}$ of the second specific moment.

Embodiment 6

The method of any prior embodiment, wherein the first antenna has at least one of: (i) a first width of a first slot that is smaller than a second width of a second slot in the second antenna; (ii) a first length of the first slot that is smaller than a second length of the second slot; (iii) a first depth of the first slot that is smaller than a second depth of the second slot; (iv) a first number of turns of a first wire that is smaller than a second number of turns of a second wire in the second antenna; and (v) a first protection cover that covers the first slot.

Embodiment 7

The method of any prior embodiment, wherein the first antenna is operated as the receiver.

Embodiment 8

The method of any prior embodiment, wherein the second antenna has a second protection cover that covers the second slot, wherein the first protection cover covers a larger portion of the first slot than the portion of the second slot that is covered by the second protection cover.

Embodiment 9

The method of any prior embodiment, wherein the first antenna is integrated in a steering assembly, the steering assembly steering the drill string in response to the determination of the property of the formation.

Embodiment 10

The method of any prior embodiment, wherein at least one of the first antenna and the second antenna is one of: (i) oriented in a transverse plane of the drill string; (ii) oriented along a longitudinal axis of the drill string; and (iii) oriented at an angle to any of the x-, y- and z-axes of the drill string.

Embodiment 11

A drilling system for drilling a wellbore through an earth formation. The drilling system includes a drill string, a first antenna disposed at a first location of the drill string, the first antenna having a first specific moment, a second antenna disposed at a second location of the drill string, the second antenna having a second specific moment larger than the first specific moment, wherein one of the first antenna and the second antenna is operated as a transmitter that transmits a transmitted signal and the other of the first antenna and the second antenna is operated as a receiver that receives to a received signal in response to the transmitted signal, and a processor. The processor is configured to determine a property of the earth formation from the received signal.

Embodiment 12

The drilling system of any prior embodiment, wherein at least one of the first specific moment and the second specific moment is specific magnetic moment.

Embodiment 13

The drilling system of any prior embodiment, wherein at least one of the first specific moment and the second specific moment is a specific electric moment.

Embodiment 14

The drilling system of any prior embodiment, wherein the drill string further comprises a drill bit and a distance of the first antenna to the drill bit is smaller than the distance of the second antenna to the drill bit.

Embodiment 15

The drilling system of any prior embodiment, wherein the first specific moment is one of: (i) half of the second specific moment; (ii) less than half of the second specific moment; (iii) less than $1/10^{th}$ of the second specific moment; (iv) less than $1/100^{th}$ of the second specific moment; and (v) less than $1/1000^{th}$ of the second specific moment.

Embodiment 16

The drilling system of any prior embodiment, wherein the first antenna has at least one of: (i) a first width of a first slot that is smaller than a second width of a second slot in the second antenna; (ii) a first length of the first slot that is smaller than a second length of the second slot; (iii) a first depth of the first slot that is smaller than a second depth of the second slot; (iv) a first number of turns of a first wire that is smaller than a second number of turns of a second wire in the second antenna; and (v) a first protection cover that covers the first slot.

Embodiment 17

The drilling system of any prior embodiment, wherein the first antenna is operated as a receiver.

Embodiment 18

The drilling system of any prior embodiment, wherein the second antenna has a second protection cover that covers the second slot, wherein the first protection cover covers a larger portion of the first slot than the portion of the second slot that is covered by the second protection cover.

Embodiment 19

The drilling system of any prior embodiment, wherein the first antenna is integrated in a steering assembly, the steering assembly configured to steer the drill string in response to the determination of the property of the formation.

Embodiment 20

The drilling system of any prior embodiment, wherein the at least one of the first antenna and the second antenna is one of: (i) oriented in a transverse plane of the drill string; (ii) oriented along a longitudinal axis of the drill string; and (iii) oriented at an angle to any of the x-, y- and z-axes of the drill string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of drilling a wellbore through an earth formation, comprising:
    disposing a first antenna at a first location of a drill string;
    disposing a second antenna at a second location of the drill string, wherein the first antenna has a first specific moment smaller than a second specific moment of the second antenna;
    operating one of the first antenna and the second antenna as a transmitter to transmit a transmitted signal; and
    operating the other of the first antenna and the second antenna as a receiver to receive a received signal in response to the transmitted signal;
    determining a property of the earth formation from the received signal.

2. The method of claim 1, wherein at least one of the first specific moment and the second specific moment is a specific magnetic moment.

3. The method of claim 1, wherein at least one of the first specific moment and the second specific moment is a specific electric moment.

4. The method of claim 1, wherein the drill string further comprises a drill bit and wherein a distance of the first antenna to the drill bit is smaller than a distance of the second antenna to the drill bit.

5. The method of claim 4, wherein the first specific moment is one of: (i) half of the second specific moment; (ii) less than half of the second specific moment; (iii) less than $1/10^{th}$ of the second specific moment; (iv) less than $1/100^{th}$ of the second specific moment; and (v) less than $1/1000^{th}$ of the second specific moment.

6. The method of claim 1, wherein the first antenna has at least one of: (i) a first width of a first slot that is smaller than a second width of a second slot in the second antenna; (ii) a first length of the first slot that is smaller than a second length of the second slot; (iii) a first depth of the first slot that is smaller than a second depth of the second slot; (iv) a first number of turns of a first wire that is smaller than a second number of turns of a second wire in the second antenna; and (v) a first protection cover that covers the first slot.

7. The method of claim 1, wherein the first antenna is operated as the receiver.

8. The method of claim 6, wherein the second antenna has a second protection cover that covers a portion of the second slot, wherein the first protection cover covers a larger portion of the first slot than the portion of the second slot that is covered by the second protection cover.

9. The method of claim 1, wherein the first antenna is integrated in a steering assembly, the steering assembly steering the drill string in response to the determination of the property of the earth formation.

10. The method of claim 1, wherein at least one of the first antenna and the second antenna is one of: (i) oriented in a transverse plane of the drill string; (ii) oriented along a longitudinal axis of the drill string; and (iii) oriented at an angle to any of the x-, y- and z-axes of the drill string.

11. A drilling system for drilling a wellbore through an earth formation, the drilling system comprising:
   a drill string;
   a first antenna disposed at a first location of the drill string, the first antenna having a first specific moment;
   a second antenna disposed at a second location of the drill string, the second antenna having a second specific moment larger than the first specific moment, wherein one of the first antenna and the second antenna is operated as a transmitter that transmits a transmitted signal and the other of the first antenna and the second antenna is operated as a receiver that receives to a received signal in response to the transmitted signal; and
   a processor configured to:
   determine a property of the earth formation from the received signal.

12. The drilling system of claim 11, wherein at least one of the first specific moment and the second specific moment is a specific magnetic moment.

13. The drilling system of claim 11, wherein at least one of the first specific moment and the second specific moment is a specific electric moment.

14. The drilling system of claim 11, wherein the drill string further comprises a drill bit and wherein a distance of the first antenna to the drill bit is smaller than a distance of the second antenna to the drill bit.

15. The drilling system of claim 11, wherein the first specific moment is one of: (i) half of the second specific moment; (ii) less than half of the second specific moment; (iii) less than $1/10^{th}$ of the second specific moment; (iv) less than $1/100^{th}$ of the second specific moment; and (v) less than $1/1000^{th}$ of the second specific moment.

16. The drilling system of claim 11, wherein the first antenna has at least one of: (i) a first width of a first slot that is smaller than a second width of a second slot in the second antenna; (ii) a first length of the first slot that is smaller than a second length of the second slot; (iii) a first depth of the first slot that is smaller than a second depth of the second slot; (iv) a first number of turns of a first wire that is smaller than a second number of turns of a second wire in the second antenna; and (v) a first protection cover that covers the first slot.

17. The drilling system of claim 11, wherein the first antenna is operated as the receiver.

18. The drilling system of claim 16, wherein the second antenna has a second protection cover that covers a portion of the second slot, wherein the first protection cover covers a larger portion of the first slot than the portion of the second slot that is covered by the second protection cover.

19. The drilling system of claim 11, wherein the first antenna is integrated in a steering assembly, the steering assembly configured to steer the drill string in response to the determination of the property of the earth formation.

20. The drilling system of claim 11, wherein the at least one of the first antenna and the second antenna is one of: (i) oriented in a transverse plane of the drill string; (ii) oriented along a longitudinal axis of the drill string; and (iii) oriented at an angle to any of the x-, y- and z-axes of the drill string.

* * * * *